United States Patent
Kodisoja et al.

(10) Patent No.: US 11,592,972 B2
(45) Date of Patent: Feb. 28, 2023

(54) ELECTRONIC DEVICE FOR FACILITATING USER INTERACTIONS WITH GRAPHICAL OBJECTS PRESENTED ON A DISPLAY

(71) Applicant: Supercell Oy, Helsinki (FI)

(72) Inventors: Mikko Kodisoja, Espoo (FI); Antti Mattila, Vantaa (FI); Riku Rikala, Helsinki (FI); Chih-Han Hsu, Helsinki (FI); Drussila Hollanda, Helsinki (FI); Patrick Corander, Klaukkala (FI)

(73) Assignee: Supercell Oy, Helsinki (FI)

( * ) Notice: Subject to any disclaimer, the term of this patent is extended or adjusted under 35 U.S.C. 154(b) by 0 days.

(21) Appl. No.: 17/727,170

(22) Filed: Apr. 22, 2022

(65) Prior Publication Data
US 2022/0317864 A1 Oct. 6, 2022

Related U.S. Application Data

(63) Continuation of application No. 17/086,995, filed on Nov. 2, 2020, now Pat. No. 11,314,397, which is a
(Continued)

(51) Int. Cl.
*G06F 3/04842* (2022.01)
*A63F 9/24* (2006.01)
(Continued)

(52) U.S. Cl.
CPC ............ *G06F 3/04842* (2013.01); *A63F 9/24* (2013.01); *A63F 13/2145* (2014.09);
(Continued)

(58) Field of Classification Search
CPC .................. A63F 9/24; A63F 2009/241; A63F 2009/2457; A63F 13/2145; A63F 13/44;
(Continued)

(56) References Cited

U.S. PATENT DOCUMENTS

2006/0068876 A1* 3/2006 Kane ........................ G07F 17/32
463/16
2010/0311489 A1* 12/2010 Miller ........................ A63F 1/12
463/31
(Continued)

FOREIGN PATENT DOCUMENTS

JP        2011101765 A    5/2011
JP          5447718 B1    3/2014
(Continued)

OTHER PUBLICATIONS

European Patent Office, Extended European Search Report, Application No. 22154997.5, dated Apr. 26, 2022, 10 pages.
(Continued)

*Primary Examiner* — Tadesse Hailu
(74) *Attorney, Agent, or Firm* — Ziegler IP Law Group, LLC

(57) ABSTRACT

An electronic device includes a display, a timer and computing hardware configured to execute a software product. Execution of the software product results in generating and rendering a graphical user interface on the display with four or more user-selectable graphical objects. Selection of a first user-selectable graphical object at a first spatial position on the graphical user interface and a movement of the selected first user-selectable graphical object along a path towards a second user-selectable graphical object at a second spatial position is detected and a position of the first user-selectable graphical object is exchanged with the position of the second user-selectable graphical object. If, during a predetermined time period, a selection of a third user-selectable graphical object and a movement of the third user-selectable graphical object towards a fourth user-selectable graphical object is detected, the positions of the third and fourth objects is exchanged.

18 Claims, 12 Drawing Sheets

Related U.S. Application Data continuation of application No. 16/411,232, filed on May 14, 2019, now Pat. No. 10,877,646, which is a continuation of application No. 15/830,706, filed on Dec. 4, 2017, now Pat. No. 10,296,188, which is a continuation of application No. 14/542,997, filed on Nov. 17, 2014, now Pat. No. 9,836,195.

(51) Int. Cl.
| | | |
|---|---|---|
| *A63F 13/52* | (2014.01) | |
| *A63F 13/44* | (2014.01) | |
| *A63F 13/2145* | (2014.01) | |
| *A63F 13/46* | (2014.01) | |
| *A63F 13/533* | (2014.01) | |
| *A63F 13/80* | (2014.01) | |
| *A63F 13/822* | (2014.01) | |

(52) U.S. Cl.
CPC .............. *A63F 13/44* (2014.09); *A63F 13/46* (2014.09); *A63F 13/52* (2014.09); *A63F 13/533* (2014.09); *A63F 13/80* (2014.09); *A63F 13/822* (2014.09); *A63F 2009/241* (2013.01); *A63F 2009/2457* (2013.01)

(58) Field of Classification Search
CPC ........ A63F 13/46; A63F 13/52; A63F 13/535; A63F 13/80; A63F 13/822
See application file for complete search history.

(56) References Cited

U.S. PATENT DOCUMENTS

| | | | | |
|---|---|---|---|---|
| 2014/0080560 | A1* | 3/2014 | Knutsson | A63F 13/573 463/10 |
| 2014/0302935 | A1* | 10/2014 | Royce | A63F 13/822 463/42 |
| 2016/0089603 | A1* | 3/2016 | Frostberg | A63F 13/80 463/31 |

FOREIGN PATENT DOCUMENTS

| | | |
|---|---|---|
| JP | 5456934 B1 | 4/2014 |
| JP | 2014155545 A | 8/2014 |

OTHER PUBLICATIONS

Silverman, David, "Make a Match-3 Game in Construct 2: Animations and Block Swapping", XP055242603, Retrieved from URL:https://web.archive.org/web/20131201220125/http://gamedevelopment.tutsplus.com/tutorials/make-a-match-3-game-in-construct-2-animations-and-block-swapping-gamedev-8354, Dec. 1, 2013, 12 pages.

Japan Patent Office, Notice of Reasons for Refusal, Application No. 2021-163175, dated Nov. 16, 2022, 3 pages.

\* cited by examiner

ELECTRONIC DEVICE FOR FACILITATING USER INTERACTIONS WITH GRAPHICAL OBJECTS PRESENTED ON A DISPLAY

TECHNICAL FIELD

The present disclosure relates generally to gaming systems, and more specifically, to electronic devices for facilitating interactions with a graphical user interface. Moreover, the present disclosure relates to methods of facilitating interactions with a graphical user interface. Moreover, the present disclosure also concerns methods of playing a game executed on a computing device. Furthermore, the present disclosure also relates to software products recorded on non-transitory machine-readable data storage media, the software products being executable on computing hardware of a computing device, for implementing the aforementioned methods.

BACKGROUND

Today, various electronic devices have been developed to provide user-friendly interfaces for facilitating easy and quick user interaction. Examples of such electronic devices include, but are not limited to, smart phones, Mobile Internet Devices (MIDs), phablet computers, tablet computers, Ultra-Mobile Personal Computers (UMPCs), Personal Digital Assistants (PDAs), web pads, handheld Personal Computers (PCs), laptop computers, interactive entertainment computers, and gaming terminals. Most of these electronic devices include touch-sensitive display screens, which make them more user-friendly and easier to use.

In order to provide entertaining experience to users, various gaming systems may be implemented on such electronic devices. An important aspect of a gaming system implemented on an electronic device is how interesting it is for a user to play a game on the gaming system.

FIGS. 1A, 1B, 10 and 1D collectively are an illustration of example steps related to playing a puzzle game with a known conventional user interface of a conventional gaming system for implementation on an electronic device; FIGS. 1A-D represent prior art. In the puzzle game, a user's purpose is to organize certain graphical objects, so as to make rows or columns of at least three matching adjacent graphical objects.

FIG. 1A is an illustration of a first step at which the user selects and moves a graphical object 102 towards another graphical object 104. Consequently, spatial positions of the graphical objects 102 and 104 are exchanged, as shown in FIG. 1B.

As a result, three adjacent graphical objects match with each other, as indicated with a horizontal row 106. For sake of clarity, the horizontal row 106 is indicated with a box in FIG. 1B.

FIG. 1C is an illustration of a step at which the horizontal row 106 disappears, thereby leaving an empty space 108.

FIG. 1D is an illustration of a next step at which graphical objects above the horizontal row 106 drop down to fill the empty space 108, and a set 110 of three new random graphical objects appears to fill the puzzle.

As a result of dropping down of the graphical objects, a new horizontal row 112 of three matching adjacent graphical objects is formed. For sake of clarity, the horizontal row 112 is indicated with a box in FIG. 1D.

At a subsequent step, the horizontal row 112 will disappear and will be replaced.

A problem with the above puzzle game is that the user can make only one move of his choice before the matching adjacent graphical objects disappear. This potentially makes the puzzle game less interesting to the user.

SUMMARY

The present disclosure seeks to provide an electronic device.

The present disclosure also seeks to provide a method of facilitating interactions with a graphical user interface.

A further aim of the present disclosure is to at least partially overcome at least some of the problems of the prior art, as discussed above.

In one aspect, embodiments of the present disclosure provide an electronic device. The electronic device comprises a display screen and a computing hardware. The computing hardware is operable to execute a software product, wherein executing the software product results in generating and rendering a graphical user interface on the display screen. The graphical user interface is configured to facilitate user interaction. When rendered, the graphical user interface presents four or more user-selectable graphical objects.

Selecting a first graphical object displayed at a first spatial position on the graphical user interface and moving the first graphical object towards a second graphical object displayed at a second spatial position on the graphical user interface is configured to result in changing the spatial position of the first graphical object from the first spatial position to the second spatial position and changing the spatial position of the second graphical object from the second spatial position to the first spatial position.

The change of the spatial position of the first and second graphical objects is configured to trigger starting a timer and enabling, during a time set by the timer, selecting at least a third graphical object displayed at a third spatial position on the graphical user interface and moving the third graphical object towards a fourth graphical object displayed at a fourth spatial position on the graphical user interface. The moving the third graphical object towards the fourth graphical object is configured to result in changing the spatial position of the third graphical object from the third spatial position to the fourth spatial position and changing the spatial position of the fourth graphical object from the fourth spatial position to the third spatial position.

In another aspect, embodiments of the present disclosure provide a method of playing a game executed on a computing device, the method comprising:

presenting four or more user-selectable graphical objects on a graphical user interface of the computing device;

detecting a selection of a first graphical object displayed at a first spatial position on the graphical user interface;

upon detecting a movement of the first graphical object towards a second graphical object displayed at a second spatial position on the graphical user interface, exchanging the spatial positions of the first and second graphical objects;

using the exchange of the spatial positions of the first and second graphical objects to start a timer, and during a time set by the timer:

enabling a selection of at least a third graphical object displayed at a third spatial position on the graphical user interface; and upon detecting a movement of the third graphical object towards a fourth graphical object displayed at a fourth spatial position on the graphical user interface, exchanging the spatial positions of the third and fourth graphical objects.

In yet another aspect, embodiments of the present disclosure provide a method of facilitating interactions with a graphical user interface, the graphical user interface being generated and rendered on a display area of an electronic device by executing a software product on a computing hardware of the electronic device, the method comprising:

presenting four or more user-selectable graphical objects within the display area;

detecting a selection of a first graphical object displayed at a first spatial position within the display area;

upon detecting a movement of the first graphical object towards a second graphical object displayed at a second spatial position within the display area, exchanging the spatial positions of the first and second graphical objects;

using the exchange of the spatial positions of the first and second graphical objects to start a timer, and during a time set by the timer:

enabling a selection of at least a third graphical object displayed at a third spatial position within the display area; and upon detecting a movement of the third graphical object towards a fourth graphical object displayed at a fourth spatial position within the display area, exchanging the spatial positions of the third and fourth graphical objects.

In still another aspect, embodiments of the present disclosure provide a software product recorded on a non-transitory machine-readable data storage medium, the software product being executable on a computing hardware of a computing device, for implementing the aforementioned method of facilitating interactions with the graphical user interface.

In one specific aspect, embodiments of the present disclosure provide an electronic device comprising:

a display screen; and a computing hardware which is operable to execute a software product, wherein executing the software product results in generating and rendering a graphical user interface on the display screen presenting a game area and a puzzle area, the puzzle area presenting four or more user-selectable graphical objects, wherein selecting a first graphical object at a first spatial position in the puzzle area and moving the first graphical object towards a second graphical object at a second spatial position in the puzzle area is configured to result in changing the spatial position of the first graphical object from the first spatial position to the second spatial position and changing the spatial position of the second graphical object from the second spatial position to the first spatial position, wherein the change of the spatial position of the first and second graphical objects is configured to trigger starting a timer and enabling selecting, during a time set by the timer, at least a third graphical object at a third spatial position in the puzzle area and moving the third graphical object towards a fourth graphical object at a fourth spatial position in the puzzle area, which moving is configured to result in changing the spatial position of the third graphical object from the third spatial position to the fourth spatial position and changing the spatial position of the fourth graphical object from the fourth spatial position to the third spatial position, wherein the graphical user interface is configured to update a point counter when at least three adjacent graphical objects match and to replace the at least three matching adjacent graphical objects, the game area presenting at least one defending element and at least one opposing element advancing toward the at least one defending element, wherein points from the point counter are applied to the at least one defending element and a certain number of points allows the at least one defending element to impede progress of the at least one opposing element toward the at least one defending element.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
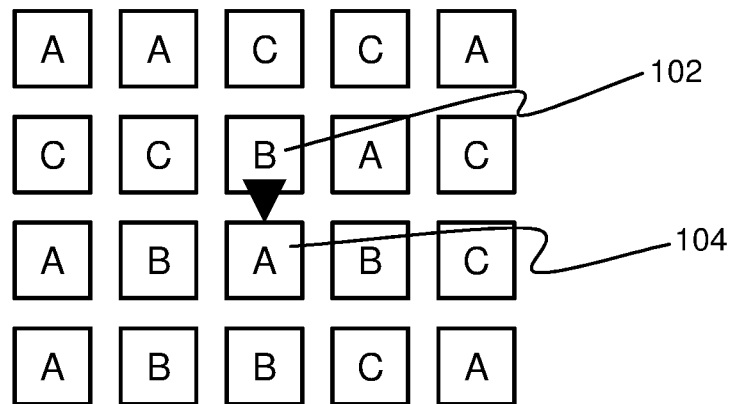
FIGS. 1A-D collectively are an illustration of example steps related to playing a puzzle game with a known conventional user interface of a conventional gaming system for implementation on an electronic device.
Figure 1B:
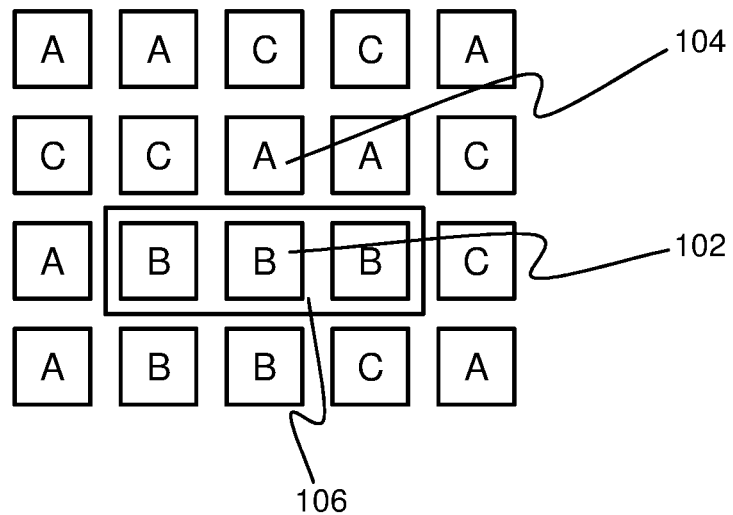
Figure 1C:
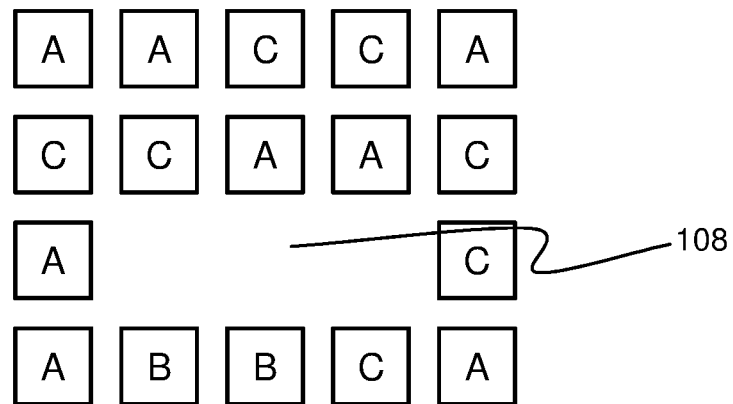
Figure 1D:
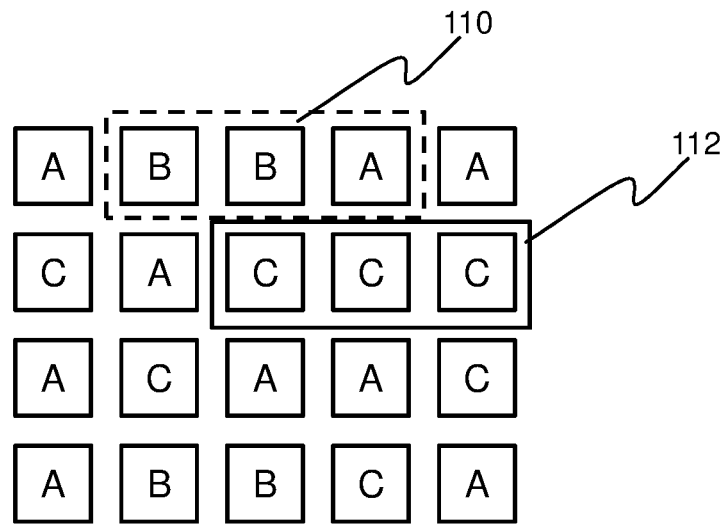

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure has been disclosed, those skilled in the art would recognize that other embodiments for carrying out or practicing the present disclosure are also possible.

In one aspect, embodiments of the present disclosure provide an electronic device. The electronic device comprises a display screen and a computing hardware. The computing hardware is operable to execute a software product, wherein executing the software product results in generating and rendering a graphical user interface on the display screen. The graphical user interface is configured to facilitate user interaction. When rendered, the graphical user interface presents four or more user-selectable graphical objects.

Selecting a first graphical object displayed at a first spatial position on the graphical user interface and moving the first graphical object towards a second graphical object displayed at a second spatial position on the graphical user interface is configured to result in changing the spatial position of the first graphical object from the first spatial position to the second spatial position and changing the spatial position of the second graphical object from the second spatial position to the first spatial position.

The change of the spatial position of the first and second graphical objects is configured to trigger starting a timer and enabling, during a time set by the timer, selecting at least a third graphical object displayed at a third spatial position on the graphical user interface and moving the third graphical object towards a fourth graphical object displayed at a fourth spatial position on the graphical user interface. The moving of the third graphical object towards the fourth graphical object is configured to result in changing the spatial position of the third graphical object from the third spatial position to the fourth spatial position and changing the spatial position of the fourth graphical object from the fourth spatial position to the third spatial position.

In some examples, the graphical objects are represented by different shapes and/or different colors. In other examples, the graphical objects are represented by different symbols, for example, such as different alphabets.

Optionally, the timer is a count-down timer. The timer can be set to any arbitrary time. Optionally, the timer can be set to a time ranging between 0.1 and 1 seconds; more optionally to a time ranging between 0.5 and 10 seconds, or, to a time ranging between 1 to 6 seconds, or between 1 to 4 seconds, or between 2 to 3 seconds.

Moreover, optionally, the graphical user interface is configured to update a point counter when at least three adjacent graphical objects match and to replace the at least three matching adjacent graphical objects.

Optionally, a number of points to be added to the point counter depend on a number of matching adjacent graphical objects that are replaced in a single move. In one example, three points may be added when three adjacent graphical objects match in a vertical column or a horizontal row.

Additionally, optionally, more points are awarded when more than one row or column of matching adjacent graphical objects are replaced in a same move.

Moreover, optionally, points are calculated progressively. In an example, the first three matching adjacent graphical objects may generate three points, while the next three matching adjacent graphical objects may generate six points. In another example, four matching adjacent graphical objects may generate 10 points, while five matching adjacent graphical objects may generate 20 points.

Optionally, points from the point counter are applied to at least one defending element of a related game. Optionally, the related game comprises the at least one defending element and at least one opposing element advancing toward the at least one defending element.

Optionally, the at least one defending element to which the points are applied is determined based on a location or a type of the at least three matching adjacent graphical objects.

Optionally, when applied to a particular defending element, the points are used to upgrade a health or stamina of that particular defending element or to charge energy to a weapon belonging to that particular defending element to be used against an opposing element. Optionally, in this regard, a graphical representation of the particular defending element can provide information about at least one of: a health of that particular defending element, a stamina of that particular defending element, and/or an energy level of a weapon to be used to attack a respective opposing element. The health of the particular defending element can be indicated with a health bar or with symbols, such as hearts and numbers.

Optionally, a certain number of points allows the at least one defending element to impede progress of the at least one opposing element toward the at least one defending element. Optionally, in this regard, the progress of the at least one opposing element is impeded by displaying a representation of the at least one defending element shooting energy at the at least one opposing element.

Moreover, the electronic device includes a user interface that is configured to detect an input corresponding to selection and movement of the first and third graphical objects toward the second and fourth graphical objects, respectively.

In an embodiment, the display screen is a touch screen. In this embodiment, the touch screen provides the user interface. Optionally, in this regard, the first and third graphical objects are selected and moved toward the second and fourth graphical objects, respectively, by a swiping action on the display screen.

In an additional or alternative embodiment, the user interface is provided by a mouse. Optionally, in this regard, the first and third graphical objects are selected and moved toward the second and fourth graphical objects, respectively, by a drag-and-drop action performed by the mouse.

Examples of the electronic device include, but are not limited to, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a desktop computer, a Network-Attached Storage (NAS) device, a large-sized touch screen with an embedded PC, and an interactive entertainment device, such as a game console. Some specific examples of the electronic device include, but are not limited to, iPhone™, iPad™, Android™ phone, Android™ web pad, Windows™ phone, and Windows™ web pad (these names include registered trademarks).

Figure 3:
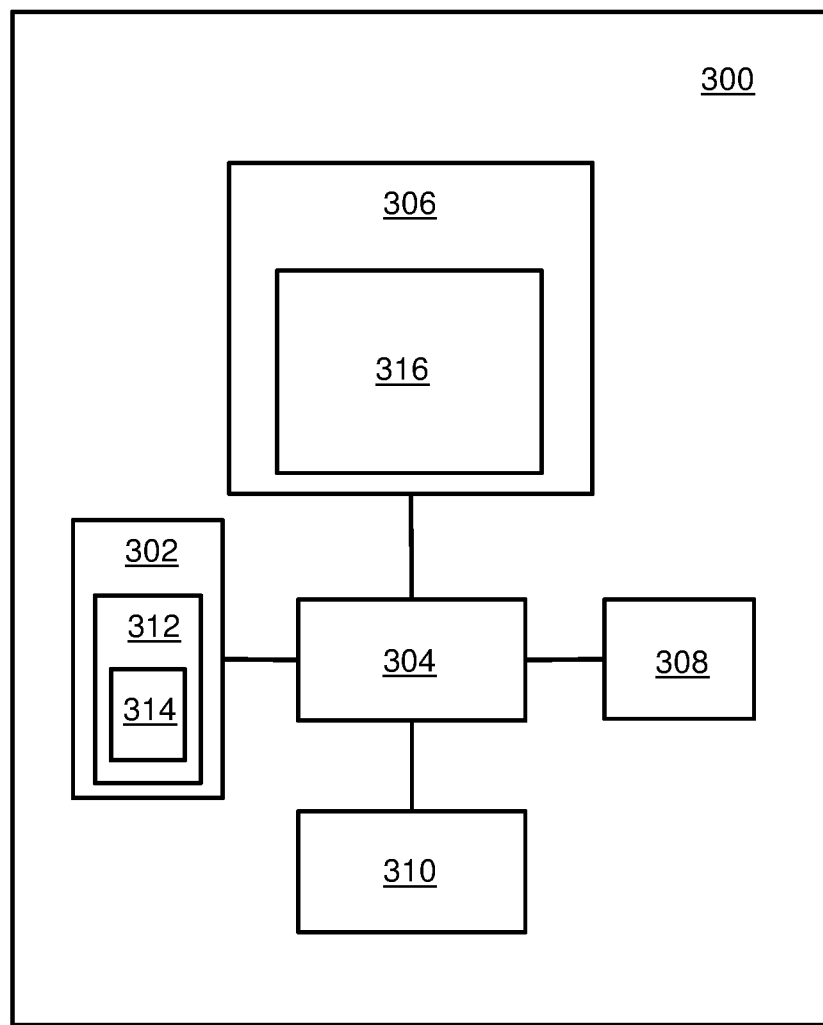
FIG. 3 is a schematic illustration of various components of an electronic device, in accordance with an embodiment of the present disclosure.

Furthermore, an example of the electronic device has been provided in conjunction with FIG. 3. The electronic device includes, but is not limited to, a memory, a computing hardware such as a processor, a display screen, other Input/Output (I/O) devices, a communication interface, and a power source.

The power source supplies electrical power to various components of the electronic device. The power source may, for example, include a rechargeable battery.

The memory optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The memory stores a software product, while the processor is operable to execute the software product. Executing the software product on the processor results in generating and rendering a graphical user interface on the display screen.

The I/O devices facilitate a user interface, which is optionally configured to detect an input corresponding to moving a pointer object, clicking or tapping the pointer object, or swiping a touch-sensitive object over the graphical user interface.

In an embodiment, the display screen is a touch-sensitive display screen that is operable to provide the user interface. The touch-sensitive display screen is operable to receive tactile inputs from a user. These tactile inputs may, for example, include clicking, tapping, pointing, moving, pressing and/or swiping with a finger or a touch-sensitive object like a pen.

Optionally, the touch-sensitive display screen is configured to sense a pressure applied by the finger or the touch-sensitive object. In one example, the touch-sensitive display screen may be a capacitive touch screen that is operable to detect changes in capacitance. In another example, the touch-sensitive display screen may be a resistive touch screen that is operable to detect changes in resistance. In yet another example, the touch-sensitive display screen is an optical touch screen that is operable to detect changes in reflectivity.

Upon detecting the tactile inputs, the software product, when executed on the processor, is configured to identify a gesture related to the tactile inputs. The gesture may take into account at least one of: a force applied by the user, a pressure applied by the user, a speed with which the pointer object was moved, a duration for which the gesture was applied, and/or a position on the touch-sensitive display screen where the gesture was applied. Consequently, the software product, when executed on the processor, is configured to analyse the gesture, and to apply an appropriate action corresponding to the gesture.

Additionally or alternatively, optionally, the I/O devices include a mouse, a keyboard or a joystick that is operable to receive inputs corresponding to clicking, pointing, and/or moving a pointer object on the graphical user interface.

Moreover, optionally, the I/O devices also include a speaker for providing an audio output to the user, and a microphone for receiving an audio input from the user.

Moreover, optionally, the electronic device includes non-transient data storage arrangements, for example, such as a database. The software product, when executed on the processor, is optionally coupled to the database. The software product, when executed on the processor, is optionally configured to substantially continuously record and update changes in status of a game being played by the user in the database. The software product, when executed on the processor, is optionally configured to resume the status of the game to its last updated status in the database, in case of interruptions in an operable state of the graphical user interface.

Additionally, the software product, when executed on the processor, may store game-related information in the database. The game-related information may, for example, include at least one of: an account of the user, credits of the user, scores of the user, the status of the game, screen-shots of the game, game-related parameters, a game view being used by the user, a game level at which the user is playing, a version of the game, and/or associated time-stamps.

Moreover, optionally, the communication interface allows the electronic device to upload the game-related information to a remote server, for example, via a communication network. Additionally, optionally, the communication interface allows the electronic device to access the remote server to download one or more new games or update one or more existing games.

Moreover, optionally, the communication interface allows the electronic device to communicate with other electronic devices.

Furthermore, embodiments of the present disclosure also provide a network environment, which includes a server, a database associated with the server, and one or more electronic devices coupled in communication with the server via a communication network. An example of such a network environment has been provided in conjunction with FIG. 2.

The network environment can be implemented in various ways, depending on various possible scenarios. In one example scenario, the network environment can be implemented by way of a spatially collocated arrangement of the server and the database. In another example scenario, the network environment can be implemented by way of a spatially distributed arrangement of the server and the database coupled mutually in communication via the communication network. In yet another example scenario, the server and the database can be implemented via cloud computing services.

The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Additionally or alternatively, the electronic devices may use their own "Bluetooth" network, and connect to a "Bluetooth" server, to synchronize with other electronic devices. ("Bluetooth" is a registered trademark).

The network environment is suitable for operating various gaming systems, simulation systems, or other similar systems. In an embodiment of the present disclosure, the network environment is suitable for operating an online gaming system.

In one embodiment, the network environment is used to implement a thin-client game. Accordingly, the gaming system may be arranged in a manner that its functionality is implemented partly in the electronic devices and partly in the server.

In another embodiment, the network environment is used to implement a thick-client game. According, the gaming system may be arranged in a manner that its functionality is implemented substantially in the electronic devices.

In yet another embodiment, the network environment is used to implement a web-based game. Accordingly, the gaming system may be arranged in a manner that its functionality is implemented substantially in the server.

The electronic devices may access the server to download one or more new games or update one or more existing games.

Users associated with the electronic devices play one or more games provided by the gaming system. The gaming system may enable the users to interact and/or share some information with each other.

Additionally, the gaming system may enable some or all of the users to play a game mutually, for example, against each other or as a team. Alternatively, the gaming system may enable the users to play their individual games irrespective of each other.

For illustration purposes, there will now be considered an example where a first user is associated with a first electronic device, a second user is associated with a second electronic device, and a third user is associated with a third electronic device. Herein, let us also consider an example situation where the gaming system enables the first and second users to play a game mutually, for example, against each other. Accordingly, graphical user interfaces are generated temporally concurrently on display screens of the first and second electronic devices, to facilitate interactions of the first and second users with their graphical user interfaces, respectively. In the example situation, the server coordinates and synchronizes the graphical user interfaces generated on the first and second electronic devices, and updates the graphical user interfaces on the first and second electronic devices concurrently with time.

Now, let us consider another example situation where the gaming system enables the third user to play a game solitarily. In such a situation, the third electronic device need not be coupled to the server substantially continuously, for example, during playing of the game. The third electronic device may be coupled to the server, for example, when downloading the game from the server. Additionally, the third electronic device may be coupled to the server periodically or randomly, for example, to receive updates from the server.

Furthermore, the server stores game-related information in the database. The game-related information may, for example, include at least one of: accounts of the users, credits of the users, scores of the users, status of games being played by the users, screen-shots of the games, game-related parameters, game views being used by the users, game levels at which the users are playing, versions of the games, and/or associated time-stamps.

Beneficially, the electronic devices and/or the server substantially continuously record and update changes in the status of the games being played by the users in the database. The electronic devices are optionally configured to resume the status of the games to their last updated status in the database, in case of interruptions in the operable state of the graphical user interfaces.

Optionally, the game-related information, including information about the changes in the status of the games, may be sent to the server in a form of data packages. A data package may typically include a header, a payload and a checksum. The checksum can be a function of the payload. Alternatively, the checksum can be a unique identifier of the user, such as a username being used by the user. Those skilled in the art will understand that an appropriate checksum function or a checksum algorithm may be applied to a plurality of data packages to obtain the checksum, while the game is being played.

In order to avoid possible frauds, the checksum corresponding to a particular data package can be recomputed at any point of time, and compared with the checksum stored with that particular data package. Thus, including the checksum in the data package potentially reduces occurrences of frauds in the game.

In another aspect, embodiments of the present disclosure provide a method of playing a game executed on a computing device, the method comprising:

presenting four or more user-selectable graphical objects on a graphical user interface of the computing device;

detecting a selection of a first graphical object displayed at a first spatial position on the graphical user interface;

upon detecting a movement of the first graphical object towards a second graphical object displayed at a second spatial position on the graphical user interface, exchanging the spatial positions of the first and second graphical objects;

using the exchange of the spatial positions of the first and second graphical objects to start a timer, and during a time set by the timer:

enabling a selection of at least a third graphical object displayed at a third spatial position on the graphical user interface; and upon detecting a movement of the third graphical object towards a fourth graphical object displayed at a fourth spatial position on the graphical user interface, exchanging the spatial positions of the third and fourth graphical objects.

According to an embodiment, the graphical user interface is rendered on a touch screen of the computing device. Optionally, in this regard, the selection of the first and third graphical objects and the movement toward the second and fourth graphical objects, respectively, is detected by recognizing a swiping action on the touch screen.

According to an embodiment, the method comprises updating a point counter when at least three adjacent graphical objects match and replacing the at least three matching adjacent graphical objects.

According to an embodiment, the method comprises applying points from the point counter to at least one defending element of a related game. Optionally, the related game comprises the at least one defending element and at least one opposing element advancing toward the at least one defending element.

According to an embodiment, the method comprises determining the at least one defending element to which the points are applied, based on a location or a type of the at least three matching adjacent graphical objects.

According to an embodiment, the method comprises impeding progress of the at least one opposing element toward the at least one defending element based on a certain number of points applied to the at least one defending element.

According to an embodiment, the method comprises impeding the progress of the at least one opposing element by displaying a representation of the at least one defending element shooting energy at the at least one opposing element.

In yet another aspect, embodiments of the present disclosure provide a method of facilitating interactions with a graphical user interface, the graphical user interface being generated and rendered on a display area of an electronic device by executing a software product on a computing hardware of the electronic device, the method comprising:

presenting four or more user-selectable graphical objects within the display area;

detecting a selection of a first graphical object displayed at a first spatial position within the display area;

upon detecting a movement of the first graphical object towards a second graphical object displayed at a second spatial position within the display area, exchanging the spatial positions of the first and second graphical objects;

using the exchange of the spatial positions of the first and second graphical objects to start a timer, and during a time set by the timer:

enabling a selection of at least a third graphical object displayed at a third spatial position within the display area; and upon detecting a movement of the third graphical object towards a fourth graphical object displayed at a fourth spatial position within the display area, exchanging the spatial positions of the third and fourth graphical objects.

According to an embodiment, the method comprises updating a point counter when at least three adjacent graphical objects match and replacing the at least three matching adjacent graphical objects.

According to an embodiment, the method comprises applying points from the point counter to at least one defending element of a related game. Optionally, the related game comprises the at least one defending element and at least one opposing element advancing toward the at least one defending element.

According to an embodiment, the method comprises determining the at least one defending element to which the points are applied, based on a location or a type of the at least three matching adjacent graphical objects.

According to an embodiment, the method comprises impeding progress of the at least one opposing element toward the at least one defending element based on a certain number of points applied to the at least one defending element.

According to an embodiment, the method comprises impeding the progress of the at least one opposing element by displaying a representation of the at least one defending element shooting energy at the at least one opposing element.

An example of steps of the aforementioned methods has been provided in conjunction with FIGS. 5A-D and 9.

In still another aspect, embodiments of the present disclosure provide a software product recorded on a non-transitory machine-readable data storage medium, the software product being executable on a computing hardware of a computing device, for implementing the aforementioned method of facilitating interactions with the graphical user interface. Optionally, the software product is downloadable from a software application store, for example, such as an "App store", to the computing device.

In one specific aspect, embodiments of the present disclosure provide an electronic device comprising:

a display screen; and a computing hardware which is operable to execute a software product, wherein executing the software product results in generating and rendering a graphical user interface on the display screen presenting a game area and a puzzle area, the puzzle area presenting four or more user-selectable graphical objects, wherein selecting a first graphical object at a first spatial position in the puzzle area and moving the first graphical object towards a second graphical object at a second spatial position in the puzzle area is configured to result in changing the spatial position of the first graphical object from the first spatial position to the second spatial position and changing the spatial position of the second graphical object from the second spatial position to the first spatial position, wherein the change of the spatial position of the first and second graphical objects is configured to trigger starting a timer and enabling selecting, during a time set by the timer, at least a third graphical object at a third spatial position in the puzzle area and moving the third graphical object towards a fourth graphical object at a fourth spatial position in the puzzle area, which moving is configured to result in changing the spatial position of the third graphical object from the third spatial position to the fourth spatial position and changing the spatial position of the fourth graphical object from the fourth spatial position to the third spatial position, wherein the graphical user interface is configured to update a point counter when at least three adjacent graphical objects match and to replace the at least three matching adjacent graphical objects, the game area presenting at least one defending element and at least one opposing element advancing toward the at least one defending element, wherein points from the point counter are applied to the at least one defending element and a certain number of points allows the at least one defending element to impede progress of the at least one opposing element toward the at least one defending element.

Figure 4:
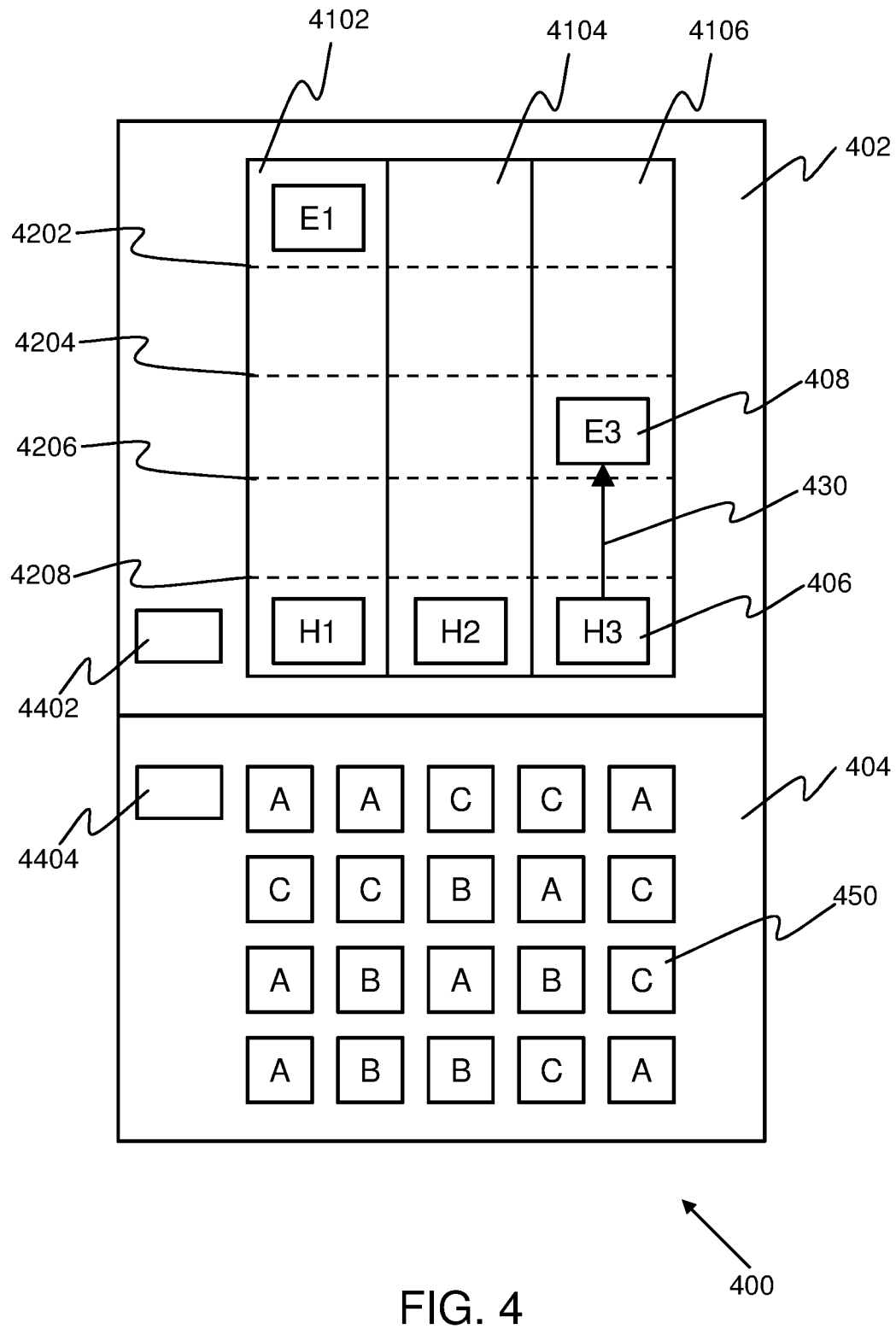
FIG. 4 is an illustration of an example game view of a gaming system, in accordance with an embodiment of the present disclosure.
Figure 6A:
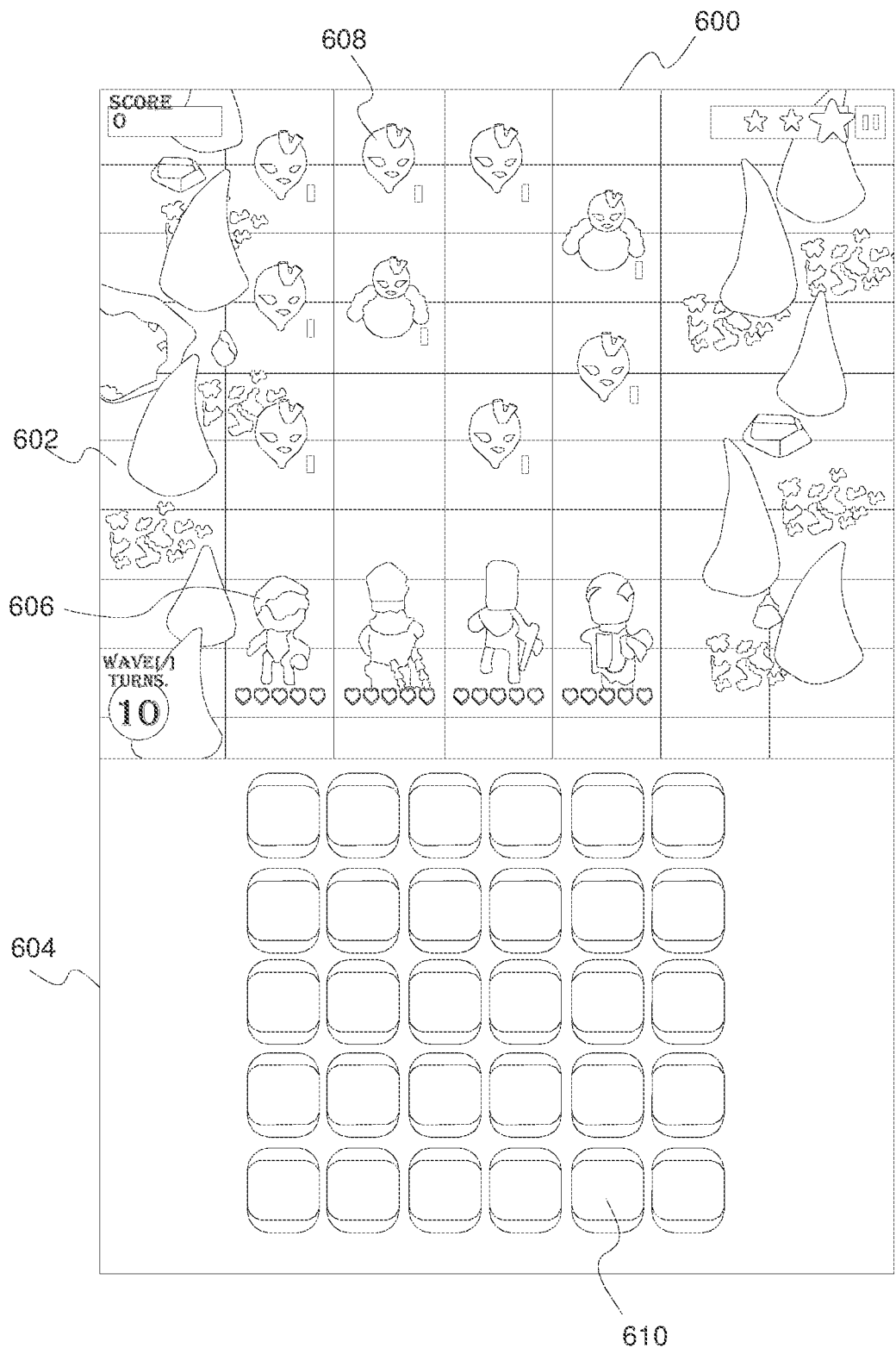
FIGS. 6A-B collectively are an illustration of an example game view, in accordance with an embodiment of the present disclosure.
Figure 6B:
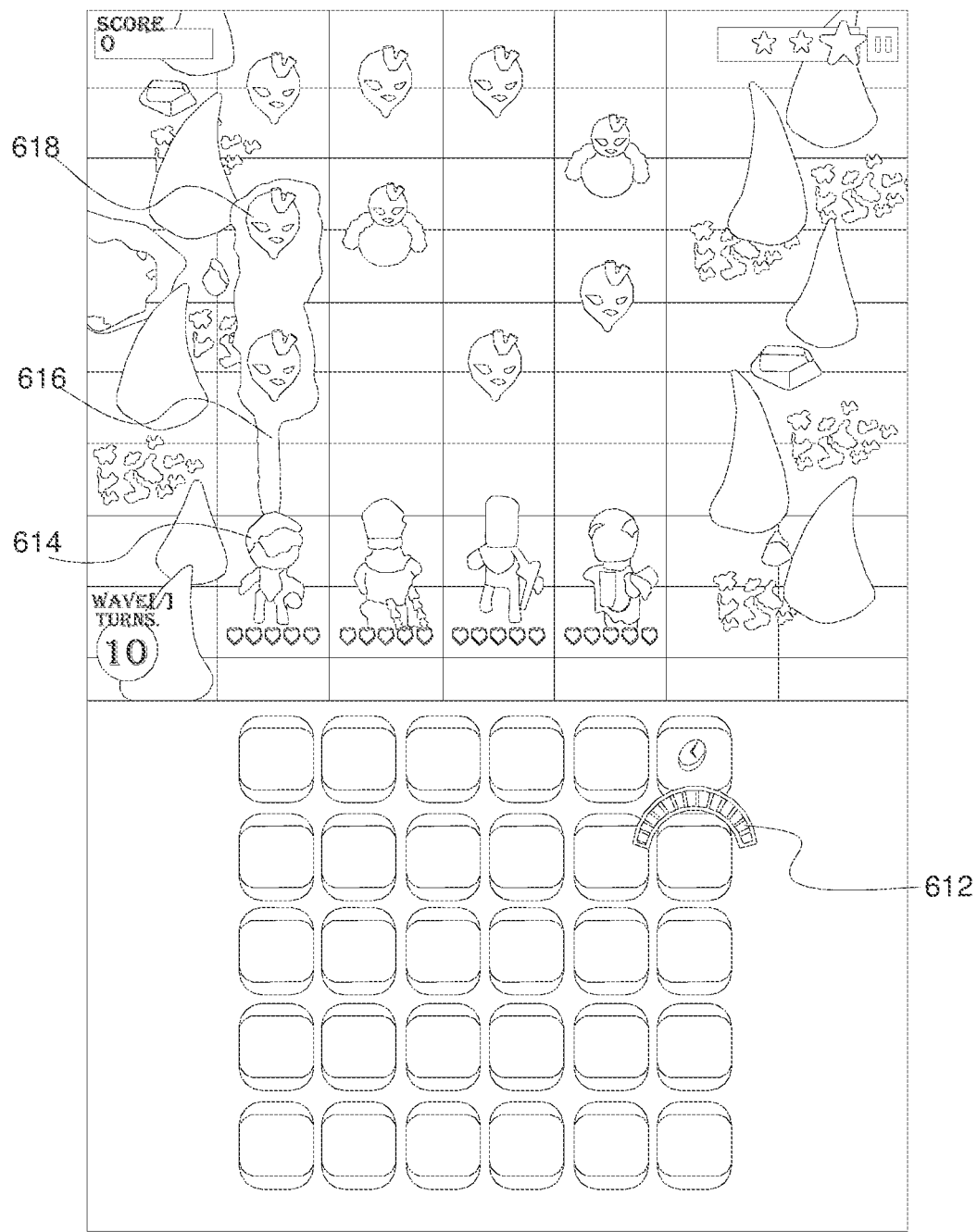

An example of the puzzle area and the game area has been provided in conjunction with FIGS. 4 and 6A-B.

Figure 2:
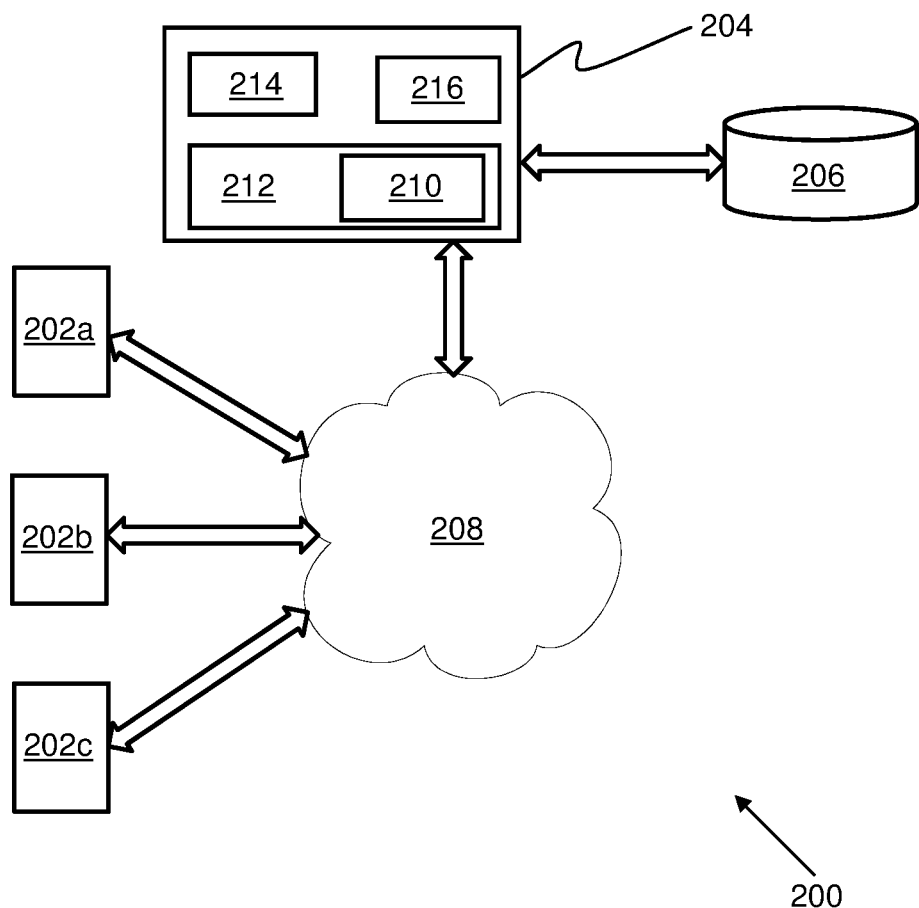
FIG. 2 is a schematic illustration of an example network environment that is suitable for practicing embodiments of the present disclosure.

Referring now to the drawings, particularly by their reference numbers, FIG. 2 is a schematic illustration of an example network environment 200 that is suitable for practicing embodiments of the present disclosure. The network environment 200 includes one or more electronic devices, depicted as an electronic device 202a, an electronic device 202b and an electronic device 202c in FIG. 2 (hereinafter collectively referred to as electronic devices 202). The network environment 200 also includes a server 204 and a database 206 associated with the server 204. The electronic devices 202 are coupled in communication with the server 204 via a communication network 208. The server 204 may include computer readable program code 210 stored on at least one computer readable medium 212 for carrying out and executing the processes and methods described herein. The computer readable medium 212 may be a memory of the server 204. In alternate aspects, the computer readable program code 210 may be stored in a memory external to, or remote from, the server 204. The memory 212 may include magnetic media, semiconductor media, optical media, or any media which is readable and executable by a computer. Server 204 may also include a processor 214 for executing the computer readable program code 210 stored on the at least one computer readable medium 212. In at least one aspect, server 204 may include one or more input or output devices, generally referred to as a user interface 216, similar to the user interface described herein, which may operate to allow input to the server 204 or to provide output from the server 204. The user interface can include a display device, a touch screen, buttons, audio input and output, and other suitable input or output devices.

FIG. 2 is merely an example, which should not unduly limit the scope of the claims herein. It is to be understood that the specific designation for the network environment 200 is provided as an example and is not to be construed as limiting the network environment 200 to specific numbers, types, or arrangements of electronic devices, servers, databases and communication networks. A person skilled in the art will recognize many variations, alternatives, and modifications of embodiments of the present disclosure.

FIG. 3 is a schematic illustration of various components of an electronic device 300, in accordance with an embodiment of the present disclosure. The electronic device 300 includes, but is not limited to, a memory 302, a computing hardware 304 such as a processor, a display screen 306, a communication interface 308, and a power source 310. The memory 302 may include a non-transitory machine readable data storage medium 312 on which a software product 314 is recorded. The software product 314, when executed by the computing hardware may cause the electronic device 300 to carry out and execute the processes and techniques described herein. In at least one embodiment, executing the software product 314 results in generating and rendering a graphical user interface 316 on the display screen. The display screen 306 includes touch sensitive means for enabling users to interact with the rendered graphics. This can include physical touch or contact or near touch.

FIG. 3 is merely an example, which should not unduly limit the scope of the claims herein. It is to be understood that the specific designation for the electronic device 300 is provided as an example and is not to be construed as limiting the electronic device 300 to specific numbers, types, or arrangements of modules and/or components of the electronic device 300. A person skilled in the art will recognize many variations, alternatives, and modifications of embodiments of the present disclosure. For example, the electronic device 300 could be implemented as the electronic devices 202, and vice versa.

FIG. 4 is an illustration of an example game view 400 of a gaming system, in accordance with an embodiment of the present disclosure. Optionally, the gaming system includes a puzzle-based strategy game running on an electronic device, for example, one or more of electronic devices 202, 300, wherein the example game view 400 of the gaming system is displayed within a display area of a display screen of the electronic device.

Optionally, in the puzzle-based strategy game, a user's purpose is to impede progress of at least one opposing element toward at least one defending element and/or to destroy the at least one opposing element. The at least one opposing element may, for example, be an element owned by another user or a simulated opponent.

With reference to FIG. 4, the example game view 400 is divided into two parts, namely a game area 402 and a puzzle area 404.

In the puzzle area 404, there are presented four or more user-selectable graphical objects, depicted as graphical objects 450 in FIG. 4. For sake of clarity and for illustration purposes, the graphical objects 450 are designated with A, B, C in FIG. 4

The user plays a puzzle game in the puzzle area 404 to earn points. Optionally, in this regard, a point counter is updated when at least three adjacent graphical objects match. For example, the at least three adjacent graphical objects may match in a vertical column or a horizontal row Additionally, optionally, the at least three matching adjacent graphical objects are replaced. An example of steps related to playing a game within the puzzle area 404 has been provided in conjunction with FIGS. 5A-D.

In the game area 402, there are presented one or more defending elements 406, depicted as defending elements H1, H2, H3 in FIG. 4, and one or more opposing elements 408, depicted as opposing elements E1 and E3 in FIG. 4.

The defending elements 406 are positioned at an end of their respective lanes, namely the defending element H1 in a lane 4102, the defending element H2 in a lane 4104, and the defending element H3 in a lane 4106. With reference to FIG. 4, the opposing elements E1 and E3 are positioned in a row above a line 4202 and a row between lines 4204 and 4206, respectively. The opposing elements E1 and E3 are positioned in the lanes 4102 and 4106, respectively, and advance toward the defending elements H1 and H3, respectively. In an example, the opposing elements E1 and E3 may advance forward by one row per move the user makes.

A task for the defending elements H1, H2 and H3 is to prevent the opposing elements E1 and E3 from crossing a line 4208. For example, in order to impede the progress of the opposing element E3, in at least one embodiment the defending element H3 may be depicted as shooting energy, one or more projectiles, or other impediments at the opposing element E3, as shown with an arrow 430 in FIG. 4.

In order to be able to shoot the opposing elements 408, the defending elements 406 are applied points from the aforementioned point counter. A defending element to which the points are applied is determined based on a location or a type of matching adjacent graphical objects. In an example, when a row or a column of graphical objects A disappear, its corresponding points may be applied to the defending element H1. Likewise, when a row or a column of graphical objects B or C disappears, corresponding points may be applied to the defending elements H2 or H3, respectively.

Moreover, beneficially, in order to be able to impede the progress of multiple opposing elements in a same move, a timer functionality is employed as will be described in conjunction with FIGS. 5A-D.

Moreover, the game view 400 includes boxes 4402 and 4404 for presenting game-related information. The game-related information may, for example, include at least one of: a score of a user, a number of moves made by the user, a game level at which the user is playing, and/or a total time of game play.

FIG. 4 is merely an example, which should not unduly limit the scope of the claims herein. A person skilled in the art will recognize many variations, alternatives, and modifications of embodiments of the present disclosure.

FIGS. 5A, 5B, 5C and 5D collectively are an illustration of example steps related to playing a game within a puzzle area, in accordance with an embodiment of the present disclosure.

Figure 5A:
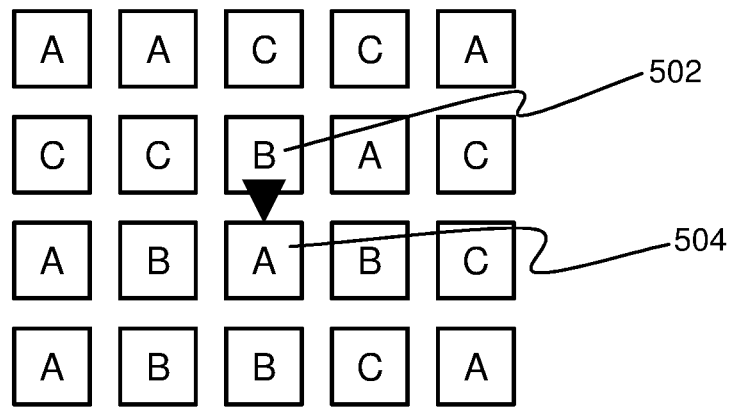
FIGS. 5A-D collectively are an illustration of example steps related to playing a game within a puzzle area, in accordance with an embodiment of the present disclosure.

FIG. 5A is an illustration of a first step at which a user selects a first graphical object 502 and moves the first graphical object 502 towards a second graphical object 504. Consequently, spatial positions of the first graphical object 502 and the second graphical object 504 are exchanged, as shown in FIG. 5B.

As a result, three adjacent graphical objects match with each other, as indicated with a horizontal row 506 of the three matching adjacent graphical objects. For sake of clarity, the horizontal row 506 is indicated with a box in FIG. 5B. The three matching adjacent graphical objects of the horizontal row 506 are then locked, so as to disable any further changes in their spatial positions.

Figure 5B:
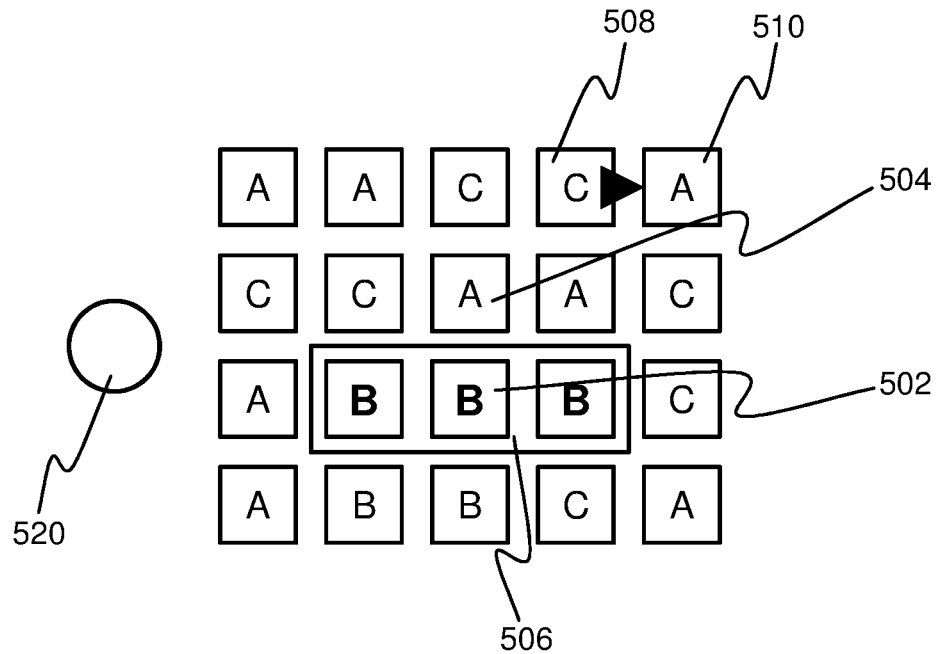

Meanwhile, a timer 520 is started, as shown in FIG. 5B. During a time set by the timer 520, the user has an opportunity to make another move before the locked blocks of the horizontal row 506 disappear.

With reference to FIG. 5B, the user selects a third graphical object 508 and move the third graphical object 508 towards a fourth graphical object 510, within the time set by the timer 520.

Figure 5C:
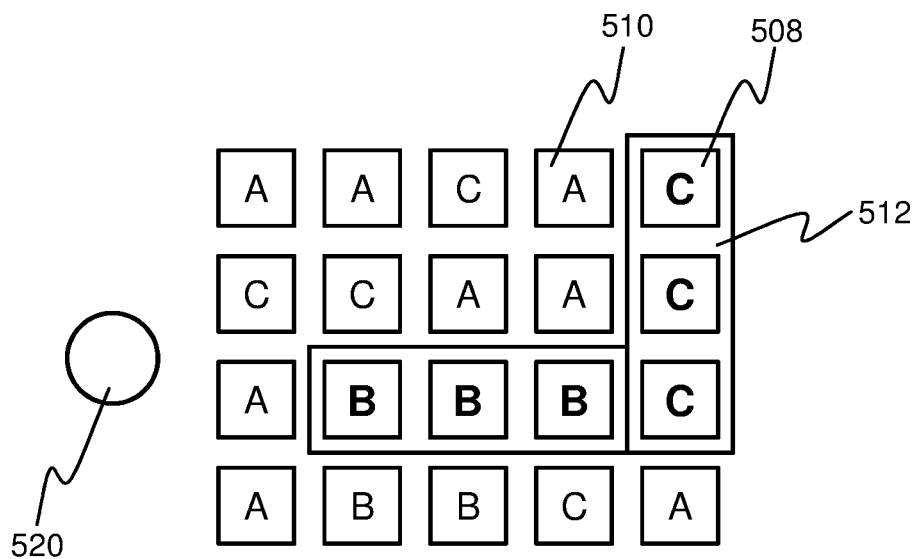
Figure 5D:
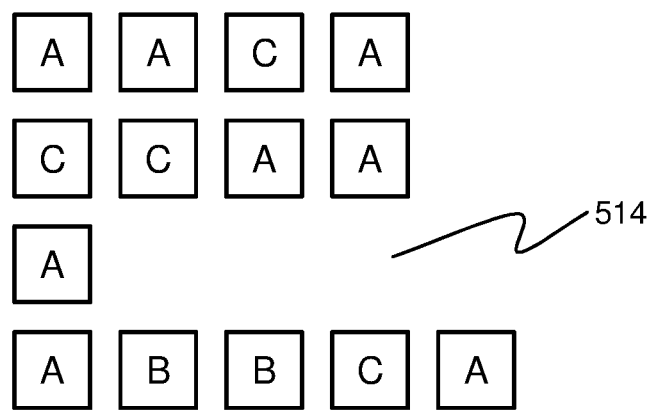

Consequently, spatial positions of the third graphical object 508 and the fourth graphical object 510 are exchanged, as shown in FIG. 5C.

As a result, three adjacent graphical objects match with each other, as indicated with a vertical column 512 of the three matching adjacent graphical objects. For sake of clarity, the vertical column 512 is indicated with a box in FIG. 5C. The three matching adjacent graphical objects of the vertical column 512 are then locked, so as to disable any further changes in their spatial positions.

Optionally, the timer 520 is reset and the user has an opportunity to make a yet another move.

Once the time set by the timer 520 is over, the horizontal row 506 and the vertical column 512 of the matching adjacent graphical objects disappear, thereby leaving an empty space 514.

Subsequently, the horizontal row 506 and the vertical column 512 are replaced. In at least one embodiment, the empty space 514 may be filled firstly by dropping down graphical objects available above the empty space 514 and then by filling new graphical objects randomly. Other replacements may include sliding graphical objects upward, filling the empty space randomly, or any other suitable replacement method.

In this manner, the timer 520 provides an opportunity to the user to make additional moves, and thus, collect points as a result of a set of moves. In an example, the user may be awarded three points for the horizontal row 506 and three points for the vertical column 512. In another example, points may be calculated progressively, and the user may be awarded three points for the horizontal row 506 and six points for the vertical column 512. This potentially enables the user to charge or upgrade more than one defending element and impede the progress of more than one corresponding opposing element in the same set of moves. This beneficially makes the game even more strategic and interesting to the user.

FIGS. 5A-D are merely examples, which should not unduly limit the scope of the claims herein. A person skilled in the art will recognize many variations, alternatives, and modifications of embodiments of the present disclosure.

FIGS. 6A and 6B collectively are an illustration of an example game view 600, in accordance with an embodiment of the present disclosure. The game view 600 includes a game area 602 and a puzzle area 604.

In the game area 602, there are shown defending elements 606 and opposing elements 608. In the puzzle area 604, there are shown user-selectable graphical objects 610.

In FIG. 6B, there is shown a timer 612 that is started when at least three adjacent graphical objects match in the puzzle area 604. As a result of the at least three matching adjacent graphical objects, points are updated to a point counter.

For illustration purposes, there is next considered an example situation where the at least three matching adjacent graphical objects are associated with a defending element 614. Thus, the points from the point counter are applied to the defending element 614. This charges a weapon 616, which is then used by the defending element 614 to shoot energy at opposing elements 618, as shown in FIG. 6B.

Moreover, during a time set by the timer 612, the user has an opportunity to make additional moves to further upgrade or charge energy to the defending element 614 and other defending elements.

Figure 7:
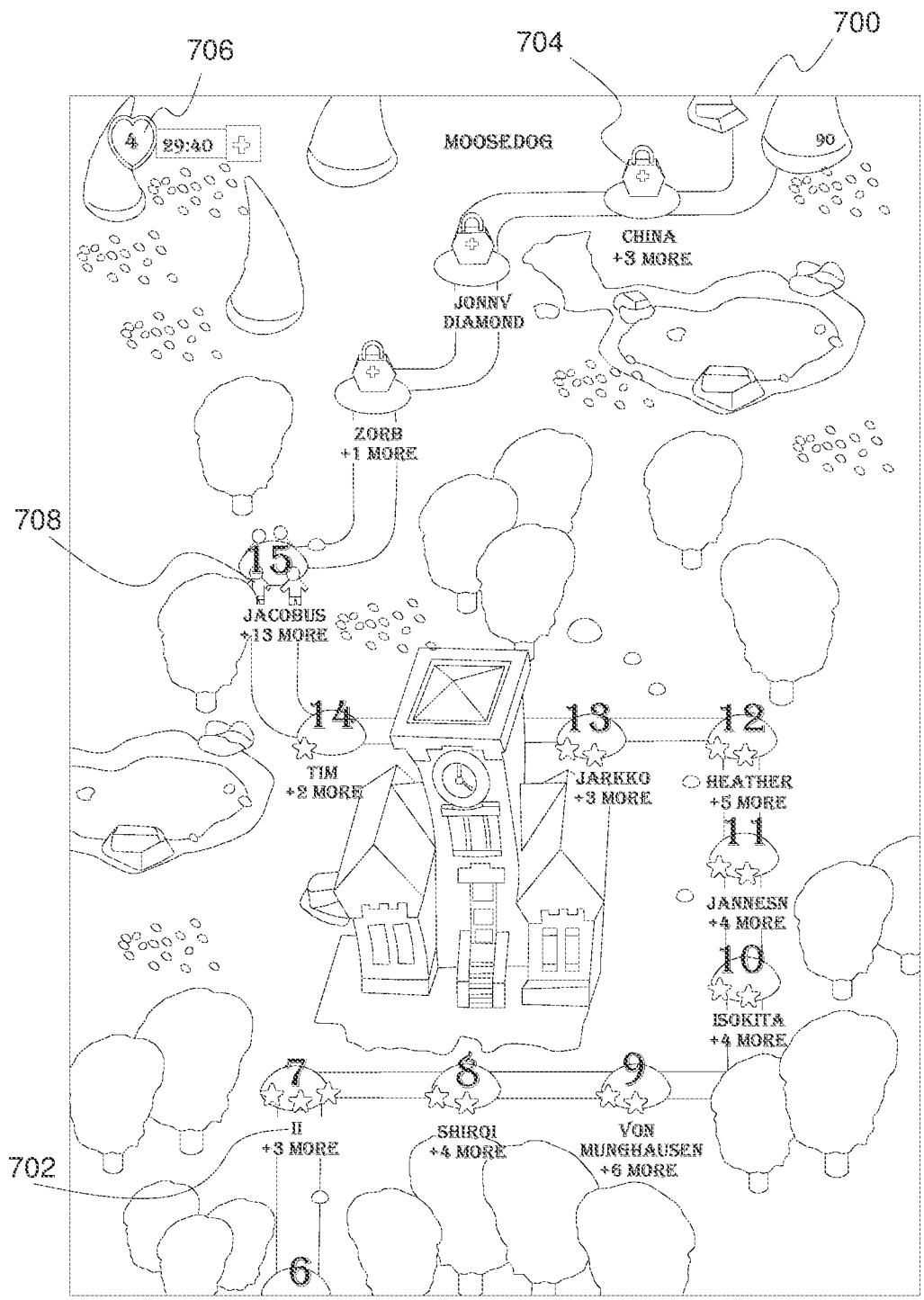
FIG. 7 is an illustration of another example game view, in accordance with an embodiment of the present disclosure.

FIG. 7 is an illustration of another example game view 700, in accordance with an embodiment of the present disclosure. In the game view 700, there are presented various game levels, depicted as opened levels 702 and unopened levels 704.

The user is allowed to select, from the opened levels 702, a game level he/she would like to play.

Optionally, a level is opened when the user has been able to destroy opposing elements in a previous level.

Moreover, the game view 700 shows a general health status 706 of defending elements 708.

Figure 8:
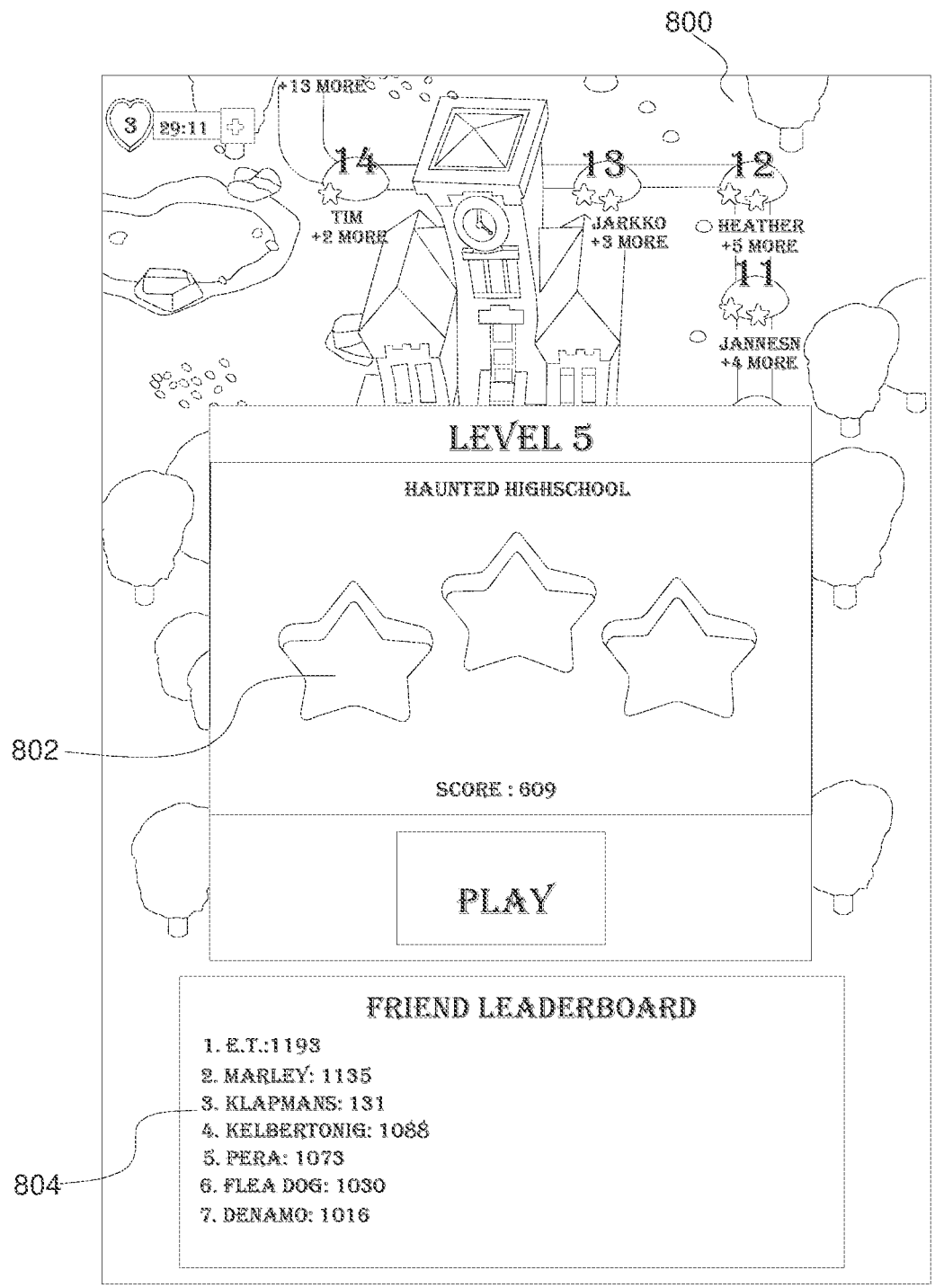
FIG. 8 is an illustration of yet another example game view, in accordance with an embodiment of the present disclosure.

FIG. 8 is an illustration of yet another example game view 800, in accordance with an embodiment of the present disclosure. In the game view 800, there is shown a score card 802 and a leader board 804.

The score card 802 provides a score of the user at a selected opened level. The leader board 804 provides scores of other users. The scores may, for example, be shared via a server.

FIGS. 6A-B, 7 and 8 are merely examples, which should not unduly limit the scope of the claims herein. A person skilled in the art will recognize many variations, alternatives, and modifications of embodiments of the present disclosure.

Figure 9:
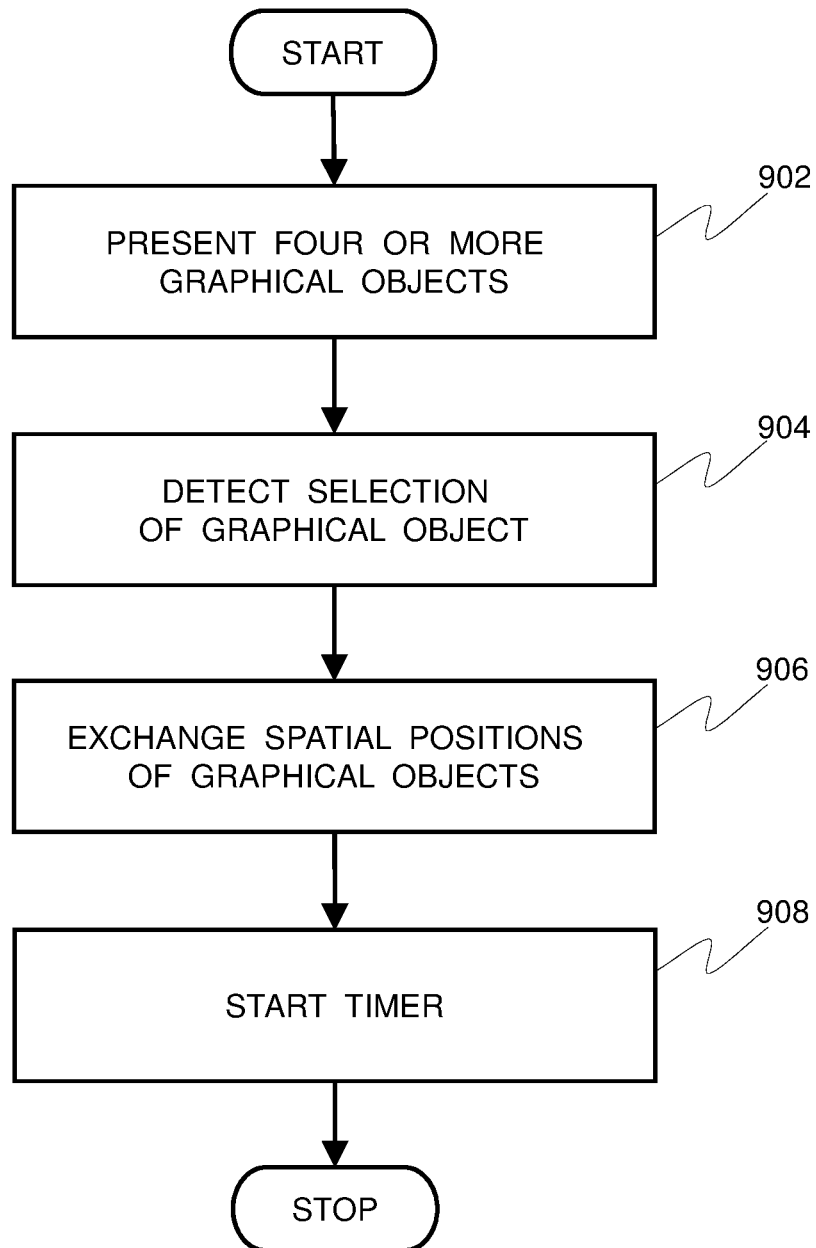
FIG. 9 is an illustration of steps of a method of facilitating interactions with a graphical user interface, in accordance with an embodiment of the present disclosure.

FIG. 9 is an illustration of steps of a method of facilitating interactions with a graphical user interface, in accordance with an embodiment of the present disclosure. The method is depicted as a collection of steps in a logical flow diagram, which represents a sequence of steps that can be implemented in hardware, software, or a combination thereof.

As described earlier, the graphical user interface is generated and rendered on a display area of an electronic device by executing a software product on a computing hardware of the electronic device.

At a step 902, four or more user-selectable graphical objects are presented within the display area.

At a step 904, a selection of a first graphical object displayed at a first spatial position within the display area is detected.

At a step 906, upon detecting a movement of the first graphical object towards a second graphical object displayed at a second spatial position within the display area, the spatial positions of the first and second graphical objects are exchanged.

At a step 908, the exchange of the spatial positions of the first and second graphical objects is used to start a timer. In accordance with the step 908, the timer enables a selection of at least a third graphical object displayed at a third spatial position within the display area, and upon detecting a movement of the third graphical object towards a fourth graphical object displayed at a fourth spatial position within the display area, an exchange of the spatial positions of the third and fourth graphical objects, during a time set by the timer.

The steps 902 to 908 are only illustrative and other alternatives can also be provided where one or more steps are added, one or more steps are removed, or one or more steps are provided in a different sequence without departing from the scope of the claims herein.

Embodiments of the present disclosure are susceptible to being used for various purposes, including, though not limited to, enabling users to make additional moves within a time set by a timer, thereby enabling the users to earn more points in a same move.

Modifications to embodiments of the present disclosure described in the foregoing are possible without departing from the scope of the present disclosure as defined by the accompanying claims. Expressions such as "including", "comprising", "incorporating", "consisting of", "have", "is"

used to describe and claim the present disclosure are intended to be construed in a non-exclusive manner, namely allowing for items, components or elements not explicitly described also to be present. Reference to the singular is also to be construed to relate to the plural.

We claim:

1. An electronic device comprising:
   a display screen;
   a timer; and
   computing hardware configured to execute non-transitory machine readable instructions, wherein execution of the non-transitory machine readable instructions by the computing hardware is configured to cause the electronic device to:
   render a graphical user interface on the display screen comprising a first part and a second part, the computing hardware being further configured to:
   present at least four graphical objects in the first part;
   detect a movement of a first graphical object from a first position in the first part towards a second graphical object in a second position in the first part;
   reposition the first graphical object to the second position and the second graphical object to the first position;
   detect that at least three adjacently positioned graphical objects of the at least four graphical objects match based upon the repositioning of the first graphical object and the second graphical object;
   lock a position of the at least three adjacently positioned graphical objects in the first part;
   start the timer;
   during a time period of the timer, enable a repositioning of a third graphical object to a position of a fourth graphical object and a repositioning of the fourth graphical object to a position of the third graphical object; and
   if, during the time period of the timer, a match of another at least three adjacently positioned graphical objects is detected, lock a position of the another at least three adjacently positioned graphical objects;
   at the end of the time period of the timer, remove graphical objects of all locked graphical objects and replace removed graphical objects with random graphical objects;
   award points for the determined matches of at least three adjacently positioned graphical objects;
   apply the awarded points to a first game object in the second part; and
   wherein a progress of movement of a second game object toward the first game object in the second part is impeded based on a value the awarded points.

2. The electronic device according to claim 1, wherein repositioning the position of the first graphical object to the position of the second graphical object further comprises the computing hardware:
   detecting a selection of the first graphical object displayed at a first spatial position on the graphical user interface;
   detecting a selection and movement of the first graphical object towards the second graphical object displayed at a second spatial position on the graphical user interface; and
   changing a spatial position of the first graphical object to the second spatial position and changing a spatial position of the second graphical object to the first spatial position.

3. The electronic device according to claim 2, wherein execution of the non-transitory machine readable instructions by the computing hardware is further configured to cause the electronic device:
   detect, the time period set by the timer, a movement of the third graphical object displayed at a third spatial position in the first area towards a fourth graphical object displayed at a fourth spatial position in the first area;
   change a spatial position of the third graphical object to the fourth spatial position and change a spatial position of the fourth graphical object to the third spatial position;
   determine if the change in spatial position of the third graphical object and the fourth graphical object creates a match of at least three adjacent graphical objects in the first part; and, if a match is detected:
      lock the at least three adjacent graphical objects of the match; and
      if the timer period has expired:
         remove the at least three adjacent graphical objects of the match from the first part;
         replace the removed at least three adjacent graphical objects with random graphical objects;
         award points for the match of the at least three adjacent graphical objects; and
         apply the awarded points to the first game object to further impede the progress of movement of the second game object.

4. The electronic device according to claim 1, wherein execution of the non-transitory machine readable instruction by the computing hardware further causes the computing hardware to remove graphical objects of all locked game objects by replacing spatial positions corresponding with respective ones of the locked graphical objects with an empty space.

5. The electronic device according to claim 4, wherein execution of the non-transitory machine readable instruction by the computing hardware further causes the computing hardware to prevent a movement of any further graphical objects in the first at or after an expiration of the time period set by the timer.

6. The electronic device according to claim 1, wherein execution of the non-transitory machine readable instruction by the computing hardware further causes the computing hardware to cause movement of the second game object towards the first game object in the second part.

7. The electronic device according to claim 1, wherein execution of the non-transitory machine readable instruction by the computing hardware further causes the computing hardware to cause a movement of the second game object towards the first game object when the number of awarded points is less than a predetermined threshold.

8. The electronic device according to claim 1, wherein the progress of movement of the second game object is impeded when a number of awarded points exceeds a predetermined threshold number of points.

9. The electronic device according to claim 1, wherein execution of the non-transitory machine readable instruction by the computing hardware is further configured to cause the computing hardware to:
   present at least one third game object and at least one fourth game object in the second part, the at least one third game object being positioned at one end of at least one further lane in the second part and at least one fourth game object being disposed at an opposing end of the at least one further lane; and when a match of the at least three adjacently positioned graphical objects is detected:
    identify a game object from one of the first game object or that at least one third game object that is associated with the matching at least three adjacently positioned graphical objects;
    apply the awarded points to the identified game object; and
    cause movement of the second game object or the at least one fourth game object away from the identified game object based on the value of the awarded points.

10. A method of playing a game executed on a computing device, the computing device including a processor configured to execute machine readable instructions, the method comprising, upon execution of the machine readable instructions by the processor, the computing device being configured to:
    render a graphical user interface on the display screen, the graphical user interface, when rendered, presenting a first part and a second part in the graphical user interface;
    present at least four graphical objects in the first part;
    detect a movement of a first graphical object from a first position in the first part towards a second graphical object in a second position in the first part;
    reposition the first graphical object to the second position and the second graphical object to the first position;
    detect that at least three adjacently positioned graphical objects of the at least four graphical objects match based upon the repositioning of the first graphical object and the second graphical object;
    lock a position of the at least three adjacently positioned graphical objects in the first part;
    start the timer;
    during a time period of the timer, enable a repositioning of a third graphical object to a position of a fourth graphical object and a repositioning of the fourth graphical object to a position of the third graphical object; and
    if, during the time period of the timer, a match of another at least three adjacently positioned graphical objects is detected, lock a position of the another at least three adjacently positioned graphical objects;
    at the end of the time period of the timer, remove graphical objects of all locked graphical objects and replace removed graphical objects with random graphical objects;
    award points for the determined matches of at least three adjacently positioned graphical objects;
    apply the awarded points to a first game object in the second part; and
    wherein a progress of movement of a second game object toward the first game object in the second part is impeded based on a value the awarded points.

11. The method according to claim 10, wherein the computing device is configured to reposition the position of the first graphical object to the position of the second graphical object by:
    detecting a selection of the first graphical object displayed at a first spatial position on the graphical user interface;
    detecting a selection and movement of the first graphical object towards the second graphical object displayed at a second spatial position on the graphical user interface; and
    changing a spatial position of the first graphical object to the second spatial position and changing a spatial position of the second graphical object to the first spatial position.

12. The method according to claim 11, wherein the method further comprises the computing device being configured to:
    detect, the time period set by the timer, a movement of the third graphical object displayed at a third spatial position in the first area towards a fourth graphical object displayed at a fourth spatial position in the first area;
    change a spatial position of the third graphical object to the fourth spatial position and change a spatial position of the fourth graphical object to the third spatial position;
    determine if the change in spatial position of the third graphical object and the fourth graphical object creates a match of at least three adjacent graphical objects in the first part; and, if a match is detected:
        lock the at least three adjacent graphical objects of the match; and
        if the timer period has expired:
            remove the at least three adjacent graphical objects of the match from the first part;
            replace the removed at least three adjacent graphical objects with random graphical objects;
            award points for the match of the at least three adjacent graphical objects; and
    apply the awarded points to the first game object to further impede the progress of movement of the second game object.

13. The method according to claim 10, wherein the method further comprises the computing device being configured to remove graphical objects of all locked game objects by replacing spatial positions corresponding with respective ones of the locked graphical objects with an empty space.

14. The method according to claim 10, wherein the method further comprises the computing device being configured to prevent a movement of any further graphical objects in the first at or after an expiration of the time period set by the timer.

15. The method according to claim 10, wherein the method further comprises the computing device being configured to cause movement of the second game object towards the first game object in the second part.

16. The method according to claim 10, wherein the method further comprises the computing device being configured to cause a movement of the second game object towards the first game object when the number of awarded points is less than a predetermined threshold.

17. The method according to claim 10, wherein the method further comprises the computing device being configured to impeded progress of movement of the second game object when a number of awarded points exceeds a predetermined threshold number of points.

18. The method according to claim 10, wherein the method further comprises the computing device being configured to:
    present at least one third game object and at least one fourth game object in the second part, the at least one third game object being positioned at one end of at least one further lane in the second part and at least one fourth game object being disposed at an opposing end of the at least one further lane; and when a match of the at least three adjacently positioned graphical objects is detected:

identify a game object from one of the first game object or that at least one third game object that is associated with the matching at least three adjacently positioned graphical objects;

apply the awarded points to the identified game object; and cause movement of the second game object or the at least one fourth game object away from the identified game object based on the value of the awarded points.

\* \* \* \* \*